United States Patent
Lu et al.

(10) Patent No.: US 12,448,560 B2
(45) Date of Patent: Oct. 21, 2025

(54) USE OF ZIRCONIUM SALTS AS SCALE INHIBITOR SQUEEZE ENHANCERS

(71) Applicant: Halliburton Energy Services, Inc., Houston, TX (US)

(72) Inventors: Alex Yi-Tsung Lu, Houston, TX (US); Zhiwei Yue, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/221,698

(22) Filed: Jul. 13, 2023

(65) Prior Publication Data

US 2025/0026975 A1 Jan. 23, 2025

(51) Int. Cl.
*C09K 8/52* (2006.01)

(52) U.S. Cl.
CPC ............ *C09K 8/52* (2013.01); *C09K 2208/22* (2013.01)

(58) Field of Classification Search
CPC .......... C09K 8/52; C09K 8/524; C09K 8/528; C09K 8/536; C09K 2208/22; E21B 37/00; E21B 41/02
See application file for complete search history.

(56) References Cited

U.S. PATENT DOCUMENTS

| | | | | |
|---|---|---|---|---|
| 4,357,248 A * | 11/1982 | Berkshire | ................. | C02F 5/14 507/236 |
| 5,002,126 A * | 3/1991 | Carlberg | ................. | C09K 8/528 507/224 |
| 10,106,721 B2 | 10/2018 | Yue et al. | | |
| 10,858,574 B2 | 12/2020 | Chen et al. | | |
| 11,608,391 B2 * | 3/2023 | Labarre | ................. | C09K 8/882 |
| 2007/0276603 A1 * | 11/2007 | Bringedal | ............ | E21B 47/103 702/6 |
| 2015/0060062 A1 * | 3/2015 | Shen | ...................... | C09K 8/685 166/279 |
| 2017/0114272 A1 | 4/2017 | Vo et al. | | |
| 2017/0342309 A1 * | 11/2017 | Yue | ........................ | C09K 8/528 |
| 2019/0338171 A1 | 11/2019 | Shen et al. | | |
| 2022/0120159 A1 | 4/2022 | Chen et al. | | |
| 2022/0145162 A1 | 5/2022 | Tomson et al. | | |

(Continued)

FOREIGN PATENT DOCUMENTS

| | | | | |
|---|---|---|---|---|
| MY | 120014 A * | 8/2005 | ............. | C09K 8/524 |
| WO | 2007095367 A2 | 8/2007 | | |
| WO | 2009144566 A1 | 12/2009 | | |

(Continued)

OTHER PUBLICATIONS

PubChem [Internet]. Bethesda (MD): National Library of Medicine (US), National Center for Biotechnology Information; 2004-. PubChem Compound Summary for CID 3045418, Zirconium lactate; [cited Feb. 29, 2024]. Available from: https://pubchem.ncbi.nlm.nih.gov/compound/Zirconium-lactate (Year: 2004).*

(Continued)

*Primary Examiner* — Angela M DiTrani Leff
(74) *Attorney, Agent, or Firm* — Conley Rose, P.C.; Rodney B. Carroll

(57) ABSTRACT

Methods can include contacting an aqueous fluid including a zirconium salt with a scale inhibitor in a subterranean formation to form a zirconium salt/scale inhibitor complex, and systems related thereto.

20 Claims, 3 Drawing Sheets

(56) References Cited

U.S. PATENT DOCUMENTS

2022/0228051 A1    7/2022  Bhandar et al.
2024/0026212 A1*   1/2024  Lalgudi ................. C09K 8/536

FOREIGN PATENT DOCUMENTS

| WO | WO-2013064823 A1 * | 5/2013 | ............... C09K 8/56 |
| WO | 2015034478 A1 | 3/2015 | |
| WO | WO-2015031047 A1 * | 3/2015 | ............... C09K 8/52 |
| WO | 2022081813 A2 | 4/2022 | |

OTHER PUBLICATIONS

Amy T. Kan, The State of the Art in Scale Inhibitor Squeeze Treatment, Petroleum Science (2020) pp. 1579-1601 vol. 17.
Malcolm A. Kelland, Production Chemicals of the Oil and Gas Industry, pp. 51-109. CRC Press.
Amy T. Kan, "Enhanced Scale-Inhibitor Treatments With the Addition of Zinc." SPE Journal, Dec. 2009. pp. 617-626.
Foreign Communication from Related Application—International Search Report and Written Opinion of the International Searching Authority, International Application No. PCT/US2024/030333, dated Sep. 13, 2024, 9 pages.

* cited by examiner

USE OF ZIRCONIUM SALTS AS SCALE INHIBITOR SQUEEZE ENHANCERS

BACKGROUND

The present disclosure relates to methods for enhancing treatment of scale in a downhole environment comprising equipment disposed in a wellbore penetrating a subterranean formation. The methods can include contacting an aqueous fluid including a zirconium salt with a scale inhibitor in the subterranean formation to form a zirconium salt/scale inhibitor complex and lead to the enhancement of the scale squeeze treatment lifetime, and systems related thereto.

Oilfield fluids (e.g., oil, gas, and water) are generally complex mixtures of aliphatic hydrocarbons, aromatics, hetero-atomic molecules, anionic and cationic salts, acids, sands, silts, clays and a vast array of other components. The nature of these fluids combined with sometimes severe conditions of heat, pressure, and turbulence to which they are often subjected during retrieval, are contributory factors to scale formation in oil and/or gas production wells and surface equipment. Wherever water production occurs, the potential for some type of scale formation exists. Scale deposits may comprise a variety of materials, including but not limited to calcium carbonate, magnesium carbonate, calcium sulfate, magnesium sulfate, barium sulfate, strontium sulfate, iron sulfides, and the like. Scale deposits can form on any surface in a downhole operation, including subterranean formations, production tubing, gravel packing screens, and other well bore equipment. Scale can develop almost immediately, or accumulate over several months before becoming noticeable. The effect scale has on productivity depends on the type, location, and the mass deposited. Scale formation can become so severe as to restrict or even completely choke production. The formation of scale can decrease permeability of the subterranean formation, reduce well productivity and shorten the lifetime of production equipment. In order to clean scale from wells and equipment, production is often stopped, which is both time-consuming and costly. Thus, an ongoing need exists for improved compositions for treatment of scale in a downhole environment, and methods of using same.

BRIEF DESCRIPTION OF THE DRAWINGS

These drawings illustrate certain aspects of some of the embodiments of the present disclosure and should not be used to limit or define the claims.

Figure 1:
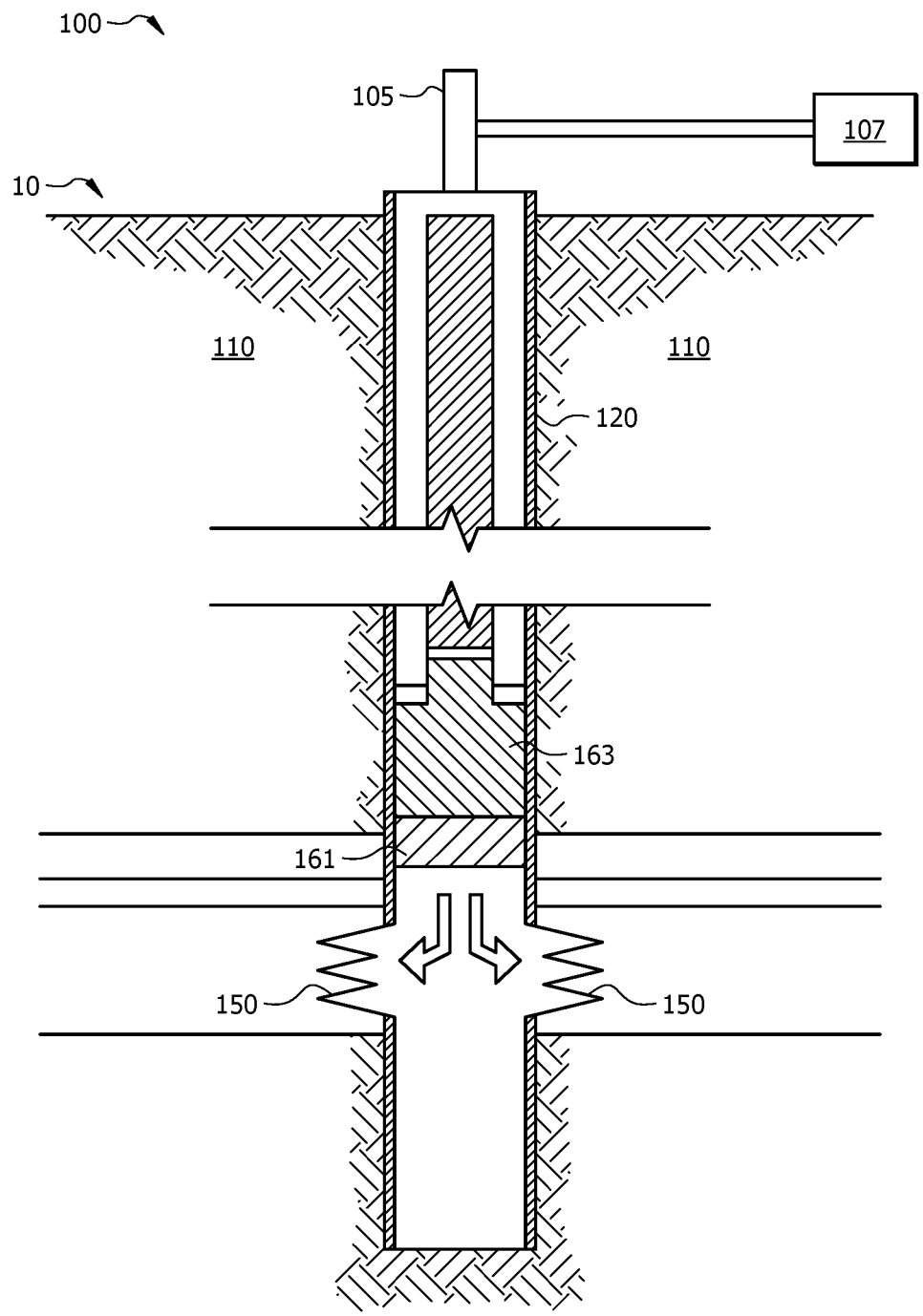
FIGS. 1 and 2 are diagrams illustrating a scale inhibitor squeeze treatment according to some embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods, systems, and compositions for use in a wellbore and/or subterranean formation. More particularly, the present disclosure relates to methods, systems, and compositions involving a treatment fluid including a zirconium salt to enhance a scale inhibitor for use in the wellbore and/or subterranean formation.

As used herein, a "treatment fluid" may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular source or action by the treatment fluid or a component thereof, unless otherwise specified herein. A treatment fluid may be used before (pre-flush), concurrent (co-flush), or after (post-flush) another treatment fluid.

As used herein, a "flush" can refer to cleaning the wellbore by pumping fluid to remove debris and/or drilling mud, and/or introducing downhole one or more additional treatments, in other words one or more treatment fluids, to a formation surrounding a wellbore. A "flush" may be introduced downhole before another fluid and be referred to as a "pre-flush", may be introduced downhole alone (a "flush") or concurrently with another fluid and may be referred to as a "co-flush", and/or may introduced downhole after another fluid and may be referred to as an "post-flush" or an "overflush".

As used herein, the term "scale," may refer to any mineral or solid salt deposit that forms in a formation, for example, when the saturation of formation water to one or more minerals is affected by changing physical conditions (such as temperature, pressure, or composition), thus causing minerals and salts previously in solution to precipitate into solids.

As used herein, the term "base fluid" refers to the major component of a fluid (as opposed to components dissolved and/or suspended therein), and does not indicate any particular condition or property of that fluid such as its mass, amount, pH, etc. The base fluid may be added above or below the surface. In some embodiments, the base fluid is and/or includes an aqueous fluid. In some embodiments, the "base fluid" can be a fluid absent a zirconium salt, and combining a base fluid or a base aqueous fluid and a zirconium salt can form an aqueous fluid including a zirconium salt, which can be referred to as a "first treatment fluid".

As used herein, a "scale inhibitor fluid" can include a scale inhibitor, which can be referred to as a "second treatment fluid".

As used herein, the term "and/or" can mean one, some, or all elements depicted in a list. As an example, "A and/or B" can mean A, B, or a combination of A and B.

As used herein, "independently" can refer to the notion that the preceding items may be the same or different.

As used herein, "complex" refers to a chemical structure or entity that forms from the interaction of two separate chemical compounds (e.g., a molecule of compound A interacts with a molecule of compound B to form an A/B complex), and without limitation, a complex typically involves attraction through noncovalent interactions like hydrogen bonding, van der Waals forces, or electrostatic interactions.

The present disclosure relates to methods, compositions, and systems for treating subterranean formations to reduce the formation of scale therein. More particularly, the present disclosure relates to methods, compositions, and systems for scale inhibitor squeeze treatments using a zirconium salt, which may be applied before, concurrently, or after the scale inhibitor squeeze treatment.

The formation of scale is often controlled by the use of chemical scale inhibitors that reduce or prevent the precipitation and/or deposit of these scales in the formation. Various methods may be used for introducing scale inhibitors into production wells. For example, a solid form of a scale inhibitor may be placed into the formation; however, this method may be limited due to the fact that there are relatively few effective solid scale inhibitors and each has functional or design limitations. Another method of placing scale inhibitor is a "squeeze" application in which a scale inhibitor is introduced into a formation, and adsorbed or precipitates onto the reservoir rock surfaces and helps prevent or diminish downhole scale formation and deposition. As an example, a scale inhibitor squeeze treatment can include injecting a scale inhibitor solution down a production well into the near wellbore formation. Commonly, these scale inhibitor treatments are injected as aqueous solutions. The chemical can be placed in the wellbore by continuous injection through a dedicated chemical flow line or by bull-heading, i.e., stopping the formation fluid flow into a wellbore, a batch treatment into the formation. The chemical can then be back produced along with the production fluid, thereby protecting all locations from the wellbore to the topside facilities. Inhibition can be considered an effective mechanism to prevent scale formation.

However, in conventional applications of these methods, it may be difficult or impossible to confirm whether the scale inhibitor has been adsorbed onto the rock surface with sufficient mechanical strength to avoid displacement by fluids flowing through the formation, and in an adequate amount to provide effective scale inhibition. In some cases, it may be difficult and/or require long periods of shut-in time to allow the scale inhibitor to adequately adsorb onto rock surfaces downhole. Thus, there is a demand for a process that overcomes these shortcomings, which is addressed by the disclosure herein.

Among the many potential advantages to the methods and compositions of the present disclosure, only some of which are alluded to herein, the methods, compositions, and systems of the present disclosure may allow for more effective application of scale inhibitor squeeze treatments in a number of ways. For example, in certain embodiments, the methods and systems of the present disclosure may reduce the shut-in time needed to allow for effective adsorption and/or precipitation of the scale inhibitor in the formation. In certain embodiments, the methods and systems of the present disclosure may permit the scale inhibitor to more strongly bond and/or adhere to rock surfaces within a formation, the forming of the zirconium salt/scale inhibitor complex may enhance the scale inhibitor adsorption and/or precipitation to the formation rock, and may increase the amount of time during which a scale inhibitor squeeze treatment may remain effective. The precipitation and/or adsorption of the scale inhibitor may at least partially depend on pH (e.g., generally tending to occur at higher pH conditions), and thus may be easily reduced or removed from the formation by altering the pH conditions downhole (e.g., flushing a weak acid solution into the formation). The methods and systems of the present disclosure may be able to place scale inhibitor squeeze treatments without the use of concentrated brines, which sometimes cause formation damage. These benefits discussed above and others may facilitate the use of certain types of scale inhibitors (e.g., polymeric scale inhibitors) that are more environmentally-friendly but often impractical or unsuitable for use in certain types of formations.

Some embodiments provide methods, compositions, and systems for applying and/or enhancing scale inhibitor squeeze treatments in subterranean formations by treating a portion of the formation with an aqueous fluid that includes one or more zirconium salts. The zirconium salt can include zirconium perchlorate, zirconium acetate, zirconium butoxide, zirconium chloride, zirconium nitrate, zirconium lactate, or a combination thereof. Generally, the zirconium lactate can be of the formula:

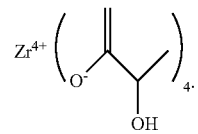

The treatment compositions of the methods, compositions, and systems may optionally be combined with any suitable base fluid, which can be an aqueous fluid. The aqueous fluids that may be suitable for use in the methods may include water from any suitable source. Such aqueous fluids may include fresh water, salt water (e.g., water containing one or more salts dissolved therein), brine (e.g., saturated salt water), seawater, or combinations thereof. In some embodiments, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the methods. In some embodiments, the pH of the aqueous fluid may be adjusted (e.g., by a buffer or other pH adjusting agent) to a specific level, which may depend on, among other factors, the types of viscosifying agents, acids, and other additives included in the fluid.

In some embodiments, the aqueous fluid can include at least about 0.1 percent (%), about 1%, about 2%, about 3%, about 4%, about 5%, about 10%, or about 20%, by weight, of one or more zirconium salts, based on the total weight of the aqueous fluid, or the aqueous fluid can include about 0.1% to about 1%, about 0.1% to about 2%, about 0.1% to about 3%, about 0.1% to about 4%, or about 0.1% to about 5%, or about 0.1% to about 10%, or about 0.1% to about 15%, or about 0.1% to about 20%, by weight, of the zirconium salt, based on the total weight of the aqueous fluid.

The aqueous fluid may further include one or more additives, such as another salt, a surfactant, an acid, a diverting agent, a fluid loss control additive, a gas, a surface modifying agent, a tackifying agent, a foamer, a corrosion inhibitor, a catalyst, a clay control agent, a biocide, a friction reducer, an antifoam agent, a bridging agent, a flocculant, a $H_2S$ scavenger, an oxygen scavenger, a lubricant, a relative permeability modifier, a wetting agent, a filter cake removal agent, an antifreeze agent, or a combination thereof. In some embodiments, the aqueous fluid can further include the another salt, the surfactant, or a combination thereof. In some embodiments, the another salt can include an alkali metal, such as lithium, sodium, potassium, rubidium, cesium, francium, or a combination thereof, and optionally corresponds with a halogen, e.g., fluorine, chlorine, bromine, iodine, or a combination thereof. In some embodiments, the another salt may be a potassium chloride.

In some embodiments, the one or more additives may be added to the first treatment fluid, such as a pre-flush fluid. In some embodiments, the one or more additives may range from about 1% to about 20%, by volume, of the total volume of the first treatment fluid. In other embodiments, the one or more additives may range from about 1% to about 10%, by volume, of the total volume of the first treatment fluid. In still other embodiments, the one or more additives may range from about 2% to about 5%, by volume, of the total volume of the first treatment fluid. In certain embodiments, the one or more additives may be added to both the pre-flush fluids and the post-flush fluids. In some embodiments, the one or more additives may range from about 1% to about 10%, by volume, of the total volume of the pre-flush fluid and range from about 2% to about 3%, by volume, of the total volume of the post-flush fluid.

The first treatment including a zirconium salt can be used in combination with scale inhibitor squeeze treatments and/or fluids, which can be referred to as a second treatment. As discussed below, the present disclosure provides certain methods of treating a subterranean formation with one or more scale inhibitors, for example, in a squeeze scale inhibitor treatment.

The scale inhibitor may be included in an aqueous fluid. Such aqueous fluids may comprise fresh water, salt water (e.g., water containing one or more salts dissolved therein), brine (e.g., saturated salt water), seawater, or any combination thereof. In some embodiments of the present disclosure, the aqueous fluids comprise one or more ionic species, such as those formed by salts dissolved in water. For example, seawater and/or produced water may comprise a variety of divalent cationic species dissolved therein. In some embodiments, the density of the aqueous fluid can be adjusted, among other purposes, to provide additional particulate transport and suspension in the compositions of the present disclosure.

In some embodiments, the pH of the aqueous fluid may be adjusted (e.g., by a buffer or other pH adjusting agent) to a specific level, which may depend on, among other factors, whether that fluid is being used to enhance adsorption, desorption, precipitation, or dissolution of the scale inhibitor. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, alcohols, organic liquids/solvents, and the like.

The scale inhibitors used in the methods and systems of the present disclosure may comprise any scale inhibitors (or combination thereof) effective to inhibit, reduce, prevent, or otherwise reduce the amount of scale buildup in comparison to the same conditions absent the presence of the scale inhibitor. The scale inhibitors can be one or more phosphonates, polyacrylates, sulfonated polymers, solid scale inhibitors, or a combination thereof. In some embodiments, the scale inhibitor can include a phosphonate scale inhibitor. The phosphonic acid can be an amino trimethylene phosphonic acid, 1-hydroxy ethane 1,1-diphosphonic acid (HEDP), amino tris(methylenephosphonic acid), ethylenediamine tetra(methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra(methylene phosphonic acid) (EDTMPA), diethylenetriamine penta(methylene phosphonic acid) (DTPMP), bis(hexamethylene triamine penta(methylene phosphonic acid)) (BHMPTPMP), polyamino polyether methylene phosphonic acid (PAPEMP), aminoethylethanolamine phosphonate (AEEA), or a combination thereof.

In some embodiments, a polyacrylate can be a polymer prepared from acrylate monomers. Although not wanting to be bound by theory, such inhibitors can act by dispersing scale-forming crystals and inhibiting their growth. Polyacrylates can maintain salt dispersion to prevent deposition, as well as modify the structure of scales to make them less tenacious and durable. Some types of polyacrylate scale inhibitors are polyacrylic acid (PAA), polyepoxysuccinic acid (PESA), polyaspartic acid (PASP), and polyphosphinocarboxylic acid (PPCA). Typically, PAA is a polymer that contains carboxylic acid groups and can disperse scale-forming crystals and inhibit their growth, and can disperse salts to prevent deposition. Generally, PESA is a polymer that contains epoxy and carboxylic acid groups to chelate metal ions and prevent their precipitation as scales. Usually, PESA has high scale inhibition performance and excellent biodegradability. Typically, PASP is a polymer that contains aspartic acid groups, and can complex with metal ions to prevent their precipitation as scales. Generally, PASP has a good calcium and environmental compatibility. PPCA can be a polymer containing phosphinocarboxylic acid groups. PPCA can chelate metal ions and prevent their precipitation as scales. Typically, PPCA has a good thermal stability and synergistic effect with other inhibitors.

Sulfonated polymers are polymers that contain sulfonic acid groups. Although not wanting to be bound by theory, sulfonated polymers can act by adsorbing onto scale-forming surfaces and blocking their nucleation and adhesion. Generally, sulfonated polymers have a high thermal stability and can inhibit scales over a wide temperature range, and can also act synergistically with other inhibitors, such as phosphonates.

Some types of sulfonated polymer scale inhibitors are sulfonated poly(carboxylic acid), which is a polymer that contains sulfonic acid and carboxylic acid groups. Although not wanting to be bound by theory, sulfonated poly(carboxylic acid) can adsorb onto scale-forming surfaces and block scale nucleation and adhesion. Generally, sulfonated poly (carboxylic acid) has a high thermal stability and can inhibit scales over a wide temperature range. Sulfonated poly (vinylsulfonate) is a polymer that contains sulfonic acid and vinylsulfonate groups. Sulfonated poly(carboxylic acid) can disperse scale-forming crystals and inhibit their growth, and typically has a good calcium compatibility and biodegradability. Sulfonated poly (acrylamide) is a polymer that contains sulfonic acid and acrylamide groups. Although not wanting to be bound by theory, sulfonated poly (acrylamide) can chelate metal ions and prevent their precipitation as scales. Generally, sulfonated poly (acrylamide) has a good performance in high hardness and high alkalinity systems.

A solid scale inhibitor can be high-strength, controlled-release additive that slowly desorbs from, e.g., a proppant pack to provide immediate and long-term protection against scale deposition. Generally, the solid scale inhibitor can be specially engineered for high-pressure, deepwater environments. The solid scale inhibitor can be applied in various applications, such as gravel packs, frac packs, or fractures in new or existing wells, and can be environmentally preferable. Examples of the solid scale inhibitor include a thermodynamic inhibitor, including one or more complexing and chelating agents, suitable for specific scales, a kinetic inhibitor for hydrate formation effective in preventing scale deposition, and an adherence inhibitor being surface active chemicals that suppress the adherence of crystals to metal surfaces.

In some embodiments, the scale inhibitors may be polymeric, as discussed above. Examples of anionic scale inhibitors that may be suitable for use in certain embodiments of the present disclosure include, but are not limited to phosphonic acids, phosphoric acids, phosphorous acid, phosphate esters, phosphonates, as discussed above, various aminopolycarboxylic acids, salts thereof, and any combinations thereof. Examples of anionic polymeric scale inhibitors that may be suitable for use in certain embodiments of the present disclosure include, but are not limited to polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), salts thereof, and any combinations thereof.

The scale inhibitor may be included in a treatment fluid in any amount or concentration suitable for a particular operation. In certain embodiments, the scale inhibitor may be included in the treatment fluid in a concentration of from about 1% to about 30% by the total volume of the second treatment fluid. In certain embodiments, the scale inhibitor may be included in the second treatment fluid in a concentration of from about 5% to about 20% by the total volume of the second treatment fluid. In certain embodiments, the scale inhibitor may be included in the second treatment fluid in a concentration of less than about 10% by the total volume of the second treatment fluid. In some embodiments, a smaller concentration of the scale inhibitor also may be included in one or more fluids (e.g., pre-flush fluids) introduced into the formation before the main treatment fluid but after the pre-flush fluid comprising the zirconium salt.

In some embodiments, the scale inhibitor squeeze treatment process may include adding a scale inhibitor in a second treatment in a concentration range of from about 5% to about 50%, by volume, based on the total volume of the second treatment. Following the pre-flush fluid, the second treatment may be injected into a formation. During this injection stage, the pumping injection pressure may be carefully monitored. Sudden pressure spiking can signal incompatibility between the injected fluid and reservoir. In some embodiments, the treatment process may include a well shut-in step. In some embodiments, after the second treatment scale inhibitor injection, the well may be shut in for a time period, for example, in the range of from about 6 hours to about 24 hours. In some embodiments, the scale inhibitor squeeze treatment process may include a well production step. Following the shut-in period, wells may be placed back in normal production operations. Brine samples may be collected regularly for analysis of the ions and residual scale inhibitors. Once the residual scale inhibitor concentration drops below the minimum inhibitor concentration (MIC) required to control scale deposition, a new scale inhibitor squeeze treatment may be injected. Without intending to be limited to any particular theory or mechanism, it is believed that the scale inhibitors may be precipitated with $Ca^{2+}$, which may enable better placement within the formation while causing less formation damage.

In some embodiments, the pre-flush fluids, concurrent fluids, and/or post-flush fluids used in the methods and systems of the present disclosure optionally may comprise any number of additional additives, as described above for aqueous fluids. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In some embodiments, a system can form a zirconium salt/scale inhibitor complex in situ downhole. A scale inhibiting system can include a first treatment fluid including a base fluid and a zirconium salt and a second treatment fluid including a scale inhibitor fluid. Generally, the first treatment fluid and the second treatment fluid can form a zirconium salt/scale inhibitor complex in situ downhole. The first treatment fluid can include any suitable amount of zirconium salt, as discussed above. In some embodiments, the zirconium salt can include zirconium lactate.

In some embodiments, the contacted first and second treatment fluids exhibit a scale inhibition recovery at least twice, thrice, or fourfold by pore volume via a column recovery test as compared to first and second treatment fluids absent the zirconium salt. Thus, the use of the treatment fluid including a zirconium salt can extend the duration that the inhibitor can be steadily released from the treated subterranean formation into produced fluids, such as brine. Particularly, the zirconium salt and optionally derivatives can enhance the adsorption of the scale inhibitor on the rock formation, such as limestone, thereby achieving extending the squeeze treatment.

In some embodiments, the methods disclosed herein can be used with a producing well, before or after a secondary treatment such as fracturing. As an example, a method for enhancing production from a well site, can include detecting equal to or greater than about 0.5%, about 1%, about 3%, about 5%, about 7%, or about 10%, by volume, water in a produced hydrocarbon fluid. After detection, a scale inhibitor and an aqueous fluid including a zirconium salt can be placed downhole. That being done, the aqueous fluid including the zirconium salt can be contacted with the scale inhibitor in a subterranean formation to form a zirconium salt/scale inhibitor complex for inhibiting scale formation. The subterranean formation can include any suitable rock, such as limestone or shale. In some embodiments, the zirconium salt can include zirconium lactate, although other zirconium salts as described above can be used. Usually, the aqueous fluid can be placed downhole at a pressure less than the fracture gradient of the subterranean formation. In some embodiments, the fracture gradient of the subterranean formation is at least about 20,000 pounds per square inch absolute (psi), about 22,000 psi, about 24,000 psi, about 25,000 psi, about 26,000 psi, about 28,000 psi, or about 30,000 psi.

In certain embodiments, the effectiveness of the scale inhibitor squeeze treatment and appropriate treatment rate may depend on the mineralogy of the rock within the subterranean formation. As an example, limestone formations can be particularly suitable for methods, systems, and compositions of the embodiments disclosed herein. In some embodiments, the effectiveness of the scale inhibitor squeeze treatment and optimal treatment rate may depend on the applied scale inhibitor concentration and/or volumes. In one or more embodiments, the effectiveness of the scale inhibitor squeeze treatment and optimal treatment rate may depend on downhole system conditions such as temperature and pH. As an example, in some embodiments, the one or more additives of the present disclosure may be used at temperatures in the range of from about 0 degrees Celsius (C) to about 200° C. In other embodiments, the one or more additives of the present disclosure may be used at temperatures in the range of from about 50° C. to about 150° C. In still other embodiments, the one or more additives of the present disclosure may be used at temperatures in the range of from about 50° C. to about 100° C. In some embodiments, the one or more additives of the present disclosure may be used at a pH less than about 8. In other embodiments, the one or more additives of the present disclosure may be used at a pH less than about 7. In still other embodiments, the one or more additives of the present disclosure may be used at a pH less than about 5.

In some embodiments, a scale inhibitor squeeze treatment in accordance with the present disclosure may provide good retention and/or release properties to offer a long-term treatment life. In certain embodiments, a successful scale inhibitor squeeze treatment in accordance with the present disclosure may result in an MIC in a range of from about 1 parts per million (ppm) to about 30 ppm, by mass. In some embodiments, the scale inhibitor may flow back to the surface at a concentration from several thousand ppm (e.g., 10,0000 ppm) to about 1 ppm, by mass. Further, in some embodiments, a successful scale inhibitor squeeze treatment in accordance with the present disclosure may result in zero or substantially zero formation damage when the scale inhibitor is placed in the reservoir.

Figure 2:
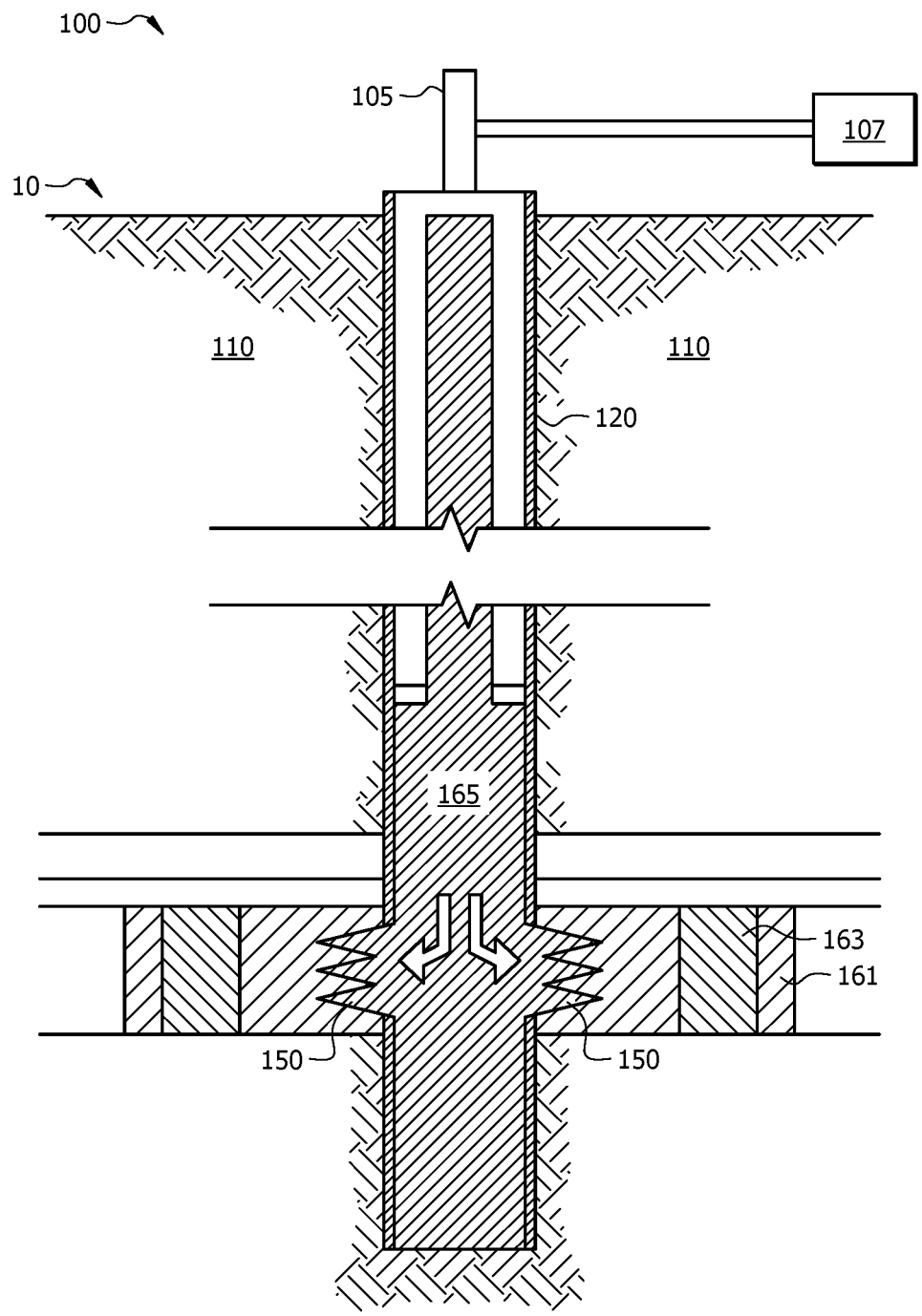

An example of one such method is illustrated in FIGS. 1-2. Referring now to FIG. 1, a scale inhibiting system 10 for a well site 100 is shown at which a well bore 120 has been drilled to penetrate a portion of subterranean formation 110. The well bore 120 may comprise an open hole, or it may include one or more casing strings disposed therein. A wellhead 105 can be installed at the top of the well bore 120 to which treating equipment 107 is coupled. The treating equipment 107 may include pumps, fluid sources, blenders, liquid additive pumps, solid additive hoppers, and/or other equipment used to prepare and/or inject fluids and additives into the well bore 120. For example treating equipment 107 may comprise a pump and blender system designed to mix the pre-flush fluids, treatment fluids, and/or post-flush fluids of the present disclosure. A string of production tubing is disposed in the well bore 120 and extends from the wellhead 105 down to approximately the depth of a hydrocarbon-bearing portion of the formation 110, and can be held in place by a packer. One or more perforations 150 in the well bore wall or casing also can provide fluid communication between the hydrocarbon-bearing portion of the formation 110 and the production tubing.

In the squeeze treatments of the present disclosure, a pre-flush or a first treatment fluid 161 of the present disclosure comprising one or more zirconium salts is injected into the production tubing using one or more pumps in the treating equipment 107. This pre-flush fluid 161 also may be used to clean debris or other substances out of the producing area of the well bore 120 and formation 110 either by mechanically displacing them from that region or by chemical treatment (e.g., acid dissolution). In certain embodiments, additional flush fluids, cleaning fluids, etc. may be injected into the well bore prior to pre-flush fluid 161. Next, a second treatment fluid 163 of the present disclosure comprising a scale inhibitor can be injected into the production tubing using one or more pumps in the treating equipment 107. In certain embodiments, the treatment fluid 163 also may be preceded by additional fluids, such as spacer fluids used to separate treatment fluid 163 from pre-flush fluid 161, or another pre-flush/treatment fluid that comprises a smaller concentration of the scale inhibitor (as compared to treatment fluid 163) that may be used to prepare the formation to adsorb the scale inhibitor in treatment fluid 163.

Referring now to FIG. 2, a later stage of the squeeze treatment from FIG. 1 is shown at the same well site 100. Following the injection of the treatment fluid 163 (and, optionally, additional spacer fluids), a post-flush/displacement fluid 165 is injected into the production tubing using one or more pumps in the treating equipment 107. As shown, the fluid 165 displaces the pre-flush fluid 161 and treatment fluid 163 through the perforations 150 and into the near well bore area of the formation 110. This allows the one or more zirconium salts in the first treatment fluid 161 to prepare the formation 110 for adsorption of the scale inhibitor that then enters the formation 110 in the second treatment fluid 163.

Following the complete injection of the fluid 165, the well bore 120 may be shut in for a period of time in order to allow the scale inhibitor to soak in and adsorb onto the rock surfaces in formation 110. This period of shut-in time may vary from a few hours to several days, depending on a number of factors that a person of skill in the art will recognize with the benefit of this disclosure, such as the size and/or depth of the well bore, temperature and/or pressure conditions in the formation, the composition of the formation, the types and amounts of surfactants and/or scale inhibitors used, and other similar factors. In certain embodiments, the shut-in time may be from about 1 hour to about 72 hours. In certain embodiments, the well bore 120 may be shut in for about 24 hours. In certain embodiments, the pH in the portion of the subterranean formation is from about 4 to about 8.

Following that shut-in time, the well bore 120 may be brought into production during which fluids from the formation 110 are permitted to flow out of the well bore 120 to the surface via production tubing. As that occurs, the produced fluids may carry some amount of the adsorbed scale inhibitor through the perforations 150 and the production tubing. In certain embodiments, this may prevent or reduce the formation of scales in those areas. In certain embodiments, additional tools, tubulars, valves, and/or other equipment may be disposed along the production tubing. The flow of the produced fluid carrying the scale inhibitor may prevent or reduce the formation of scales in that equipment as well. In some instances, the concentration of scale inhibitor in the fluids flowing out of the well bore 120 may be monitored during production to confirm that they are sufficient to control scale formation at that well. If the concentration of the scale inhibitor falls below a certain threshold amount, it may be determined that additional treatments (e.g., additional scale inhibitor squeeze treatments) will be performed.

The pre-flush fluids, concurrent treatment fluids, and/or post-flush fluids used in the methods and systems of the present disclosure may comprise any base fluid known in the art, including aqueous base fluids, non-aqueous base fluids, and any combinations thereof. The first and second treatment fluids 161 and 163 can be introduced in any order. In some embodiments, the first treatment fluid 161 can be introduced first and the second treatment fluid 163 afterwards, as discussed above, as a regimen for treating the subterranean formation 110. In some embodiments, the second treatment fluid 163 can be introduced first and the first treatment fluid 161 can be introduced afterwards as another regimen, or the first and second treatment fluids 161 and 163 can be introduced simultaneously as a further regimen. Any of these regimens may be introduced repeatedly, i.e., once, twice, thrice, etc., or the regimens may be introduced in any combination.

EXAMPLES

The aspects having been generally described, the following examples are given as particular aspects of the disclosure and to demonstrate the practice and advantages thereof. It is understood that the examples are given by way of illustration and are not intended to limit the specification or the claims in any manner.

Dynamic sandpack experiments investigate the adsorption and/or desorption behavior of the chemical inhibitors selected to treat a representative rock matrix of a formation. The term "sandpack" as used in an experiment refers to column packing methodology, rather than the actual packing materials that can be essentially any particles such as quartz and/or sand, chalk and/or limestone, silt, or Sadlerochit reservoir rock of the Prudhoe Bay oil field of Alaska, in either synthetic or crushed rocks.

The general testing conditions can include a packing material, namely sieved crushed limestone particles sized about 0.5 millimeter (mm) to about 1 mm or about 18 to about 40 mesh. The packing column dimension can have a length of 100 mm and a diameter of 10 mm with two units connected in series. The flowrate can be 2 milliliter per minute (mL/min), or 1 mL/min for column conditioning and inhibitor and/or additive injection. The core pore volume (P.V.) can be 3.0 mL. The inhibitor squeeze can be prepared by using 15%, by volume, of the selected scale inhibitor as active ingredient in a synthetic aquifer water with pH adjusted to the reported values using HCl or NaOH. The injection brine includes a descaling synthetic water with a pH adjusted to about 5.1 to about 5.3 and the testing temperature is 200 degrees Fahrenheit (° F.). Table 1 depicts the water chemistries of the inhibitor squeeze and the injection brine:

TABLE 1

| Ions/<br>Parameters<br>Applications | Produced<br>water<br>(Ions<br>in ppm) | Low TDS<br>water, brine<br>injection<br>Ions in ppm |
|---|---|---|
| Sodium (Na$^+$) | 24,000 | 200 |
| Potassium (K$^+$) | 900 | 10 |
| Magnesium (Mg$^{2+}$) | 1,400 | 140 |
| Calcium (Ca$^{2+}$) | 7,700 | 50 |
| Strontium (Sr$^{2+}$) | 290 | — |
| Barium (Ba$^{2+}$) | — | — |
| Chloride (Cl$^-$) | 54,000 | 400 |
| Sulfate (SO$_4^{2-}$) | 460 | 270 |
| Bicarbonates (HCO$_3^-$) | 530 | 200 |
| pH | 5.5 | 7.2 |

Example 1

Figure 3:
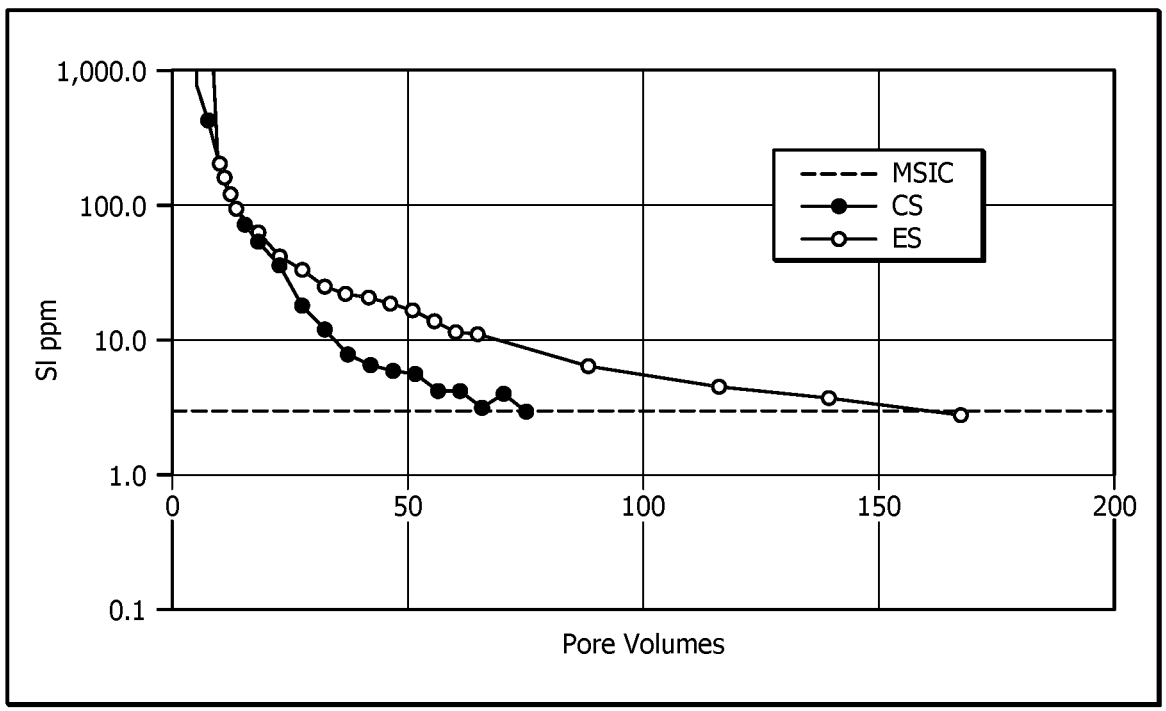
FIGS. 3-4 are a graphical depictions each comparing a treatment fluid with zirconium lactate of an embodiment and a comparative treatment without zirconium lactate.

The enhancement performance for a squeeze inhibitor is conducted in this sand-pack test. Two separated scale inhibitor squeeze treatments are performed. For the comparative scale inhibitor squeeze treatment (CS), no zirconium lactate is added during the pre-flush stage, serving as a baseline for reference. For the scale inhibitor squeeze treatment of an embodiment (ES), a pre-flush fluid containing 1%, by volume, zirconium lactate is applied to the packed columns. As depicted in FIG. 3, the concentration of scale inhibitor in fluids in ppm (SI ppm) is recovered from the columns as a function of pore volumes. Line ES represents the scale inhibitor squeeze treatment after the pre-flush injection with zirconium lactate additive. Line CS represents the normal squeeze treatment after pre-flush treatment without the zirconium lactate. The minimum scale inhibitor concentration (MSIC) is pre-determined as 3 ppm. As depicted in FIG. 3, with utilization of zirconium lactate additive in the pre-flush fluid, the retention of the scale inhibitor increased to 160 pore volumes from 75 pore volumes. With utilization of the zirconium lactate additive, 85 additional pore volumes imply a boost of treatment life.

Example 2

Figure 4:
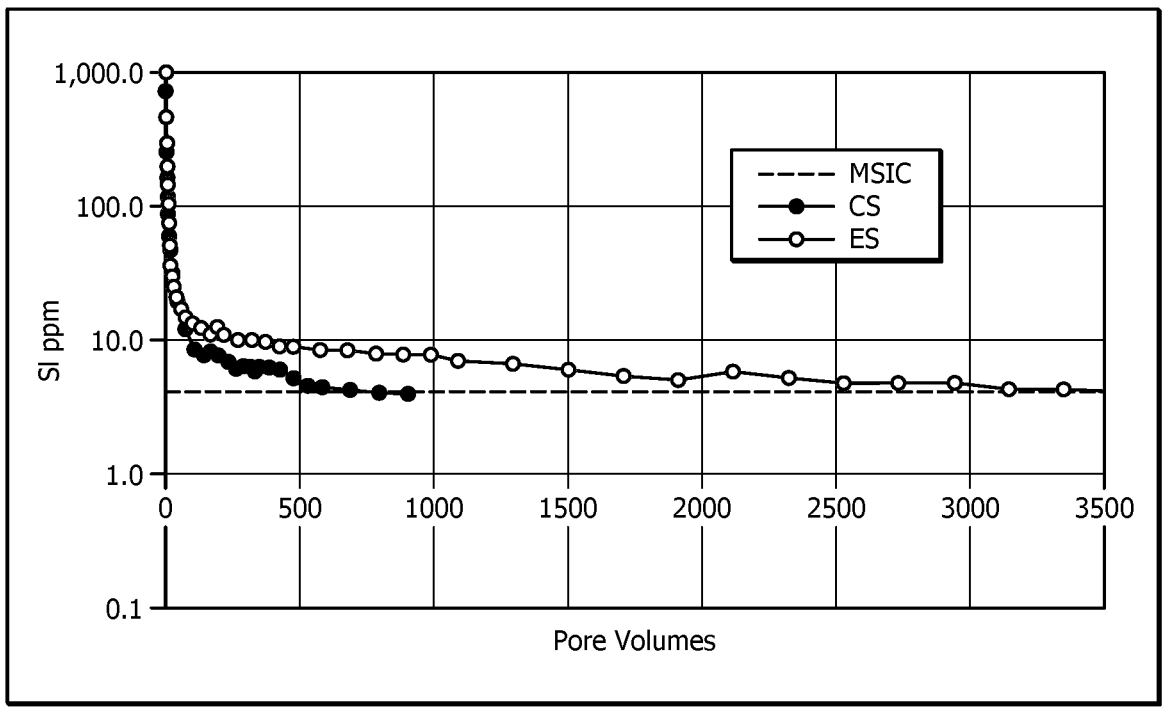

The enhancement performance for a squeeze inhibitor is conducted with a scale inhibitor different from the scale inhibitor of Example 1. Two separate squeeze treatments are tested. Before the first scale inhibitor squeeze treatment, no zirconium lactate is added during the pre-flush stage. For the second scale inhibitor squeeze treatment, a pre-flush fluid containing 1% by volume zirconium lactate is applied to the formation. As depicted in FIG. 4, the concentration of scale inhibitor in fluids in ppm (SI ppm) is recovered from the columns as a function of pore volumes. For the scale inhibitor squeeze treatment of an embodiment (ES), the line ES represents the scale inhibitor squeeze treatment after pre-flush treatment with the zirconium lactate. For the comparative scale inhibitor squeeze treatment (CS), the line CS represents the previous squeeze treatment after pre-flush treatment without the zirconium lactate. As seen from FIG. 4, the treatment life is increased to 3000 pore volumes from 900 pore volumes. With utilization of the zirconium lactate additive, 2000 additional pore volumes imply a boost of treatment life.

Additional Disclosure

The following are non-limiting, specific embodiments in accordance with the present disclosure.

A first embodiment, which is a method comprises: contacting an aqueous fluid 161 comprising a zirconium salt with a scale inhibitor in a subterranean formation 110 to form a zirconium salt/scale inhibitor complex, wherein the zirconium salt/scale inhibitor complex is in contact with (e.g., and adheres to) one or more surfaces in the subterranean formation such as a perforation surface, a fracture face, a fracture surface, a formation surface, a pore surface, a wellbore surface, a proppant surface, a proppant pack surface, a gravel pack surface, a rock surface, a rock matrix surface, or any combination thereof.

A second embodiment, which is the method of the first embodiment, wherein the zirconium salt comprises zirconium perchlorate, zirconium acetate, zirconium butoxide, zirconium chloride, zirconium nitrate, zirconium lactate, or a combination thereof.

A third embodiment, which is the method of the first embodiment or second embodiment, wherein the zirconium salt comprises a zirconium lactate of formula:

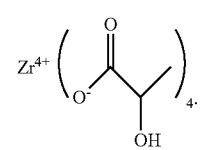

A fourth embodiment, which is the method of any of the proceeding embodiments, wherein the aqueous fluid 161 further comprises fresh water, salt water, brine, seawater, or a combination thereof.

A fifth embodiment, which is the method of any of the proceeding embodiments, wherein the aqueous fluid 161 further comprises another salt, a surfactant, an acid, a buffer, a diverting agent, a fluid loss control additive, a gas, a surface modifying agent, a tackifying agent, a foamer, a corrosion inhibitor, a catalyst, a clay control agent, a biocide, a friction reducer, an antifoam agent, a bridging agent, a flocculant, a $H_2S$ scavenger, an oxygen scavenger, a lubricant, a relative permeability modifier, a wetting agent, a filter cake removal agent, an antifreeze agent, or a combination thereof.

A sixth embodiment, which is the method of any of the proceeding embodiments, wherein the aqueous fluid 161 further comprises another salt, a surfactant, or a combination thereof.

A seventh embodiment, which is the method of any of the proceeding embodiments, wherein the another salt comprises potassium chloride.

An eighth embodiment, which is the method of any of the proceeding embodiments, wherein the aqueous fluid 161 is introduced into the subterranean formation 110 before the scale inhibitor.

A ninth embodiment, which is the method of any of the proceeding embodiments, wherein the aqueous fluid 161 is introduced simultaneously with the scale inhibitor into the subterranean formation 110.

A tenth embodiment, which is the method of any of the proceeding embodiments, wherein the aqueous fluid 161 is introduced into the subterranean formation 110 after the scale inhibitor.

An eleventh embodiment, which is the method of any of the proceeding embodiments, wherein the aqueous fluid 161 comprises at least about 1%, by weight, of the zirconium salt based on the total weight of the aqueous fluid 161.

A twelfth embodiment, which is the method of any of the proceeding embodiments, wherein the aqueous fluid 161 comprises about 0.1% to about 5%, by weight, of the zirconium salt based on the total weight of the aqueous fluid 161.

A thirteenth embodiment, which is the method of any of the proceeding embodiments, wherein the scale inhibitor comprises a phosphonate scale inhibitor, a polyacrylate scale inhibitor, a sulfonated polymer scale inhibitor, a solid scale inhibitor, or a combination thereof.

A fourteenth embodiment, which is the method of any of the proceeding embodiments, wherein the scale inhibitor comprises a phosphonate scale inhibitor or a polymeric scale inhibitor.

A fifteenth embodiment, which is the method of any of the proceeding embodiments, wherein the zirconium salt/scale inhibitor complex enhances the adsorption and/or precipitation of the scale inhibitor to the subterranean formation.

A sixteenth embodiment, which is a method for enhancing a scale inhibition treatment, comprises: mixing a base fluid and a zirconium salt to form an aqueous fluid 161; placing the aqueous fluid 161 downhole to contact a subterranean formation 110; and afterwards placing a scale inhibitor fluid 163 downhole to contact the aqueous fluid 161 forming a zirconium salt/scale inhibitor complex.

A seventeenth embodiment, which is the method of the sixteenth embodiment, wherein the zirconium salt comprises a zirconium lactate.

An eighteenth embodiment, which is a method for enhancing production from a well site 100, comprises: detecting equal to or greater than about 1%, by volume, water in a produced hydrocarbon fluid; placing a scale inhibitor and an aqueous fluid 161 comprising a zirconium salt downhole; and contacting the aqueous fluid 161 comprising the zirconium salt with the scale inhibitor in a subterranean formation 110 to form a zirconium salt/scale inhibitor complex for inhibiting scale formation.

A nineteenth embodiment, which is a method of the eighteenth embodiment, wherein the zirconium salt comprises zirconium lactate.

A twentieth embodiment, which is a method of the eighteenth embodiment or nineteenth embodiment, further comprises placing the aqueous fluid 161 downhole at a pressure less than the fracture gradient of the subterranean formation 110.

A twenty-first embodiment, which is the method of any one of the eighteenth embodiment through twentieth embodiment, wherein the fracture gradient of the subterranean formation 110 is at least about 20,000 psi.

A twenty-second embodiment, which is a scale inhibiting system 10, comprises: a first treatment fluid 161 comprising a base fluid and a zirconium salt; and a second treatment fluid 163 comprising a scale inhibitor fluid, wherein the first treatment fluid 161 and the second treatment fluid 163 form a zirconium salt/scale inhibitor complex in situ downhole.

A twenty-third embodiment, which is a scale inhibiting system 10 of the twenty-second embodiment, wherein the first treatment fluid 161 comprises at least about 0.1%, by weight, of the zirconium salt.

A twenty-fourth embodiment, which is a scale inhibiting system 10 of the twenty-second embodiment or twenty-third embodiment, wherein the first treatment fluid 161 comprises about 0.1% to about 5%, by weight, of the zirconium salt.

A twenty-fifth embodiment, which is a scale inhibiting system 10 of any one of the twenty-second embodiment through twenty-fourth embodiment, wherein the contacted first and second treatment fluids 161 and 163 exhibit a scale inhibition recovery at least twice by pore volume via a column recovery test as compared to first and second treatment fluids absent the zirconium salt.

A twenty-sixth embodiment, which is a scale inhibiting system 10 of any one of the twenty-second embodiment through twenty-fifth embodiment, wherein the zirconium salt comprises zirconium lactate.

A twenty-seventh embodiment, which is a method of treating scale in a downhole environment comprising equipment disposed in a wellbore penetrating a subterranean formation, wherein surfaces of the equipment and/or the formation are contacted with a zirconium salt (e.g., zirconium lactate) prior to, concurrent with, or after contact of the surface with one or more scale inhibitors, wherein the method comprises (a) Pre-flush stage: a pre-flush fluid, comprising the zirconium salt and fresh water or brine, is pumped into the well; (b) Scale Inhibitor Injection: the scale inhibitor is mixed with a carrier fluid (often water or brine) and then injected into the well at a pressure high enough to overcome the formation pressure, forcing the fluid into the rock matrix (e.g., to achieve good penetration of the inhibitor into the formation), wherein the zirconium salt and the scale inhibitor contact each other and form a complex; (c) optionally, an Overflush (e.g., post-flush): once the scale inhibitor has been injected, an overflush is optionally performed to help distribute the inhibitor deeper into the formation; and (d) Shut-in Stage or period: a period of time during which the well is closed off to allow the inhibitor to soak into the rock formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
contacting an aqueous fluid comprising a zirconium salt comprising a zirconium lactate with a scale inhibitor in a subterranean formation to form a zirconium salt/scale inhibitor complex,
wherein the zirconium salt/scale inhibitor complex enhances retention of scale inhibitor within the subterranean formation by at least 85 additional pore volumes.

2. The method of claim 1, wherein the zirconium salt comprises the zirconium lactate of formula:

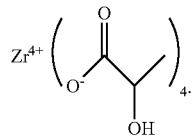

3. The method of claim 1, wherein the aqueous fluid further comprises fresh water, salt water, brine, seawater, or a combination thereof.

4. The method of claim 1, wherein the aqueous fluid further comprises another salt, a surfactant, an acid, a buffer, a diverting agent, a fluid loss control additive, a gas, a surface modifying agent, a tackifying agent, a foamer, a corrosion inhibitor, a catalyst, a clay control agent, a biocide, a friction reducer, an antifoam agent, a bridging agent, a flocculant, a $H_2S$ scavenger, an oxygen scavenger, a lubricant, a relative permeability modifier, a wetting agent, a filter cake removal agent, an antifreeze agent, or a combination thereof.

5. The method of claim 1, wherein the aqueous fluid further comprises another salt, a surfactant, or a combination thereof.

6. The method of claim 5, wherein the aqueous fluid comprises another salt comprising potassium chloride.

7. The method of claim 1, wherein the aqueous fluid is introduced before the scale inhibitor into the subterranean formation, wherein the aqueous fluid is introduced simultaneously with the scale inhibitor into the subterranean formation, or wherein the aqueous fluid is introduced after the scale inhibitor into the subterranean formation.

8. The method of claim 1, wherein the aqueous fluid comprises about 0.1% to about 5%, by weight, of the zirconium salt based on total weight of the aqueous fluid.

9. The method of claim 1, wherein the scale inhibitor comprises a phosphonate scale inhibitor, a polyacrylate scale inhibitor, a sulfonated polymer scale inhibitor, a solid scale inhibitor, or a combination thereof.

10. The method of claim 1, wherein the scale inhibitor comprises a phosphonate scale inhibitor or a polymeric scale inhibitor.

11. The method of claim 1, wherein the zirconium salt/ scale inhibitor complex enhances retention by between 85 to 2,100 pore volumes.

12. The method of claim 1, wherein the aqueous fluid comprises about 10% to about 15%, by weight, of the zirconium salt based on total weight of the aqueous fluid.

13. A method for enhancing a scale inhibition treatment, comprising:
mixing a base fluid and a zirconium salt comprising a zirconium lactate to form an aqueous fluid;
placing the aqueous fluid downhole to contact a subterranean formation;
afterwards placing a scale inhibitor fluid downhole to contact the aqueous fluid forming a zirconium salt/scale inhibitor complex,
wherein the zirconium salt/scale inhibitor complex enhances retention of scale inhibitor within the subterranean formation by at least 85 additional pore volumes, and
wherein the aqueous fluid comprises at least about 1%, by weight, of the zirconium lactate based on total weight of the aqueous fluid.

14. The method of claim 13, wherein the aqueous fluid comprises about 1% to about 5%, by weight, of the zirconium salt based on total weight of the aqueous fluid.

15. A method for enhancing production from a well site, comprising:
detecting equal to or greater than about 1%, by volume, water in a produced hydrocarbon fluid;
placing a scale inhibitor and an aqueous fluid comprising a zirconium salt comprising a zirconium lactate downhole; and
contacting the aqueous fluid comprising the zirconium salt with the scale inhibitor in a subterranean formation to form a zirconium salt/scale inhibitor complex for inhibiting scale formation to enhance retention between 85- to 2,100 additional pore volumes.

16. The method of claim 15, further comprising placing the aqueous fluid downhole at a pressure less than a fracture gradient of the subterranean formation.

17. The method of claim 16, wherein the fracture gradient of the subterranean formation is at least about 20,000 psi.

18. The method of claim 15, wherein the aqueous fluid comprises at least about 1%, by weight, of the zirconium salt based on total weight of the aqueous fluid.

19. The method of claim 15, wherein the aqueous fluid comprises about 0.1% to about 5%, by weight, of the zirconium salt based on total weight of the aqueous fluid.

20. The method of claim 15, wherein the aqueous fluid comprises about 10% to about 15%, by weight, of the zirconium salt based on total weight of the aqueous fluid.

* * * * *